United States Patent

[11] 3,564,219

| [72] | Inventor | John S. Mutziger |
| | | East Moline, Ill. |
| [21] | Appl. No. | 735,277 |
| [22] | Filed | June 7, 1968 |
| [45] | Patented | Feb. 16, 1971 |
| [73] | Assignee | Honeywell Inc. |
| | | Minneapolis, Minn. |
| | | a corporation of Delaware |

[54] INDICATING DEVICE
4 Claims, 5 Drawing Figs.

[52] U.S. Cl. ........................................... 235/92,
235/151.32; 33/142
[51] Int. Cl. ......................................................... G06m 1/272
[50] Field of Search ........................................ 235/92, 53,
29T, 29F, 151.32, 103; 242/201; 33/142

[56] References Cited
UNITED STATES PATENTS

| 2,944,750 | 7/1960 | Hall | 242/55.12 |
| 3,160,741 | 12/1964 | Gottschall | 235/92 |
| 3,172,208 | 3/1965 | Lowy | 33/142 |

*Primary Examiner*—Maynard R. Wilbur
*Assistant Examiner*—Robert F. Gnuse
*Attorneys*—Arthur H. Swanson and Lockwood D. Burton ABSTRACT: The indicator of this invention measures the amount of a web material wound upon a spool by utilizing the principle that the rate at which the spool rotates, as the web is wound or unwound therefrom, varies in proportion to the amount of the web material thereon. A pulse generator is provided for generating pulses which indicate the rotational velocity of the spool and a second pulse generator is provided for generating pulses which indicate the linear velocity of the web material. A counter counts the number of pulses generated by the linear web motion during each pulse generated by the rotating spool. The accumulated count is then stored and displayed for indicating the amount of the web material upon the spool.

PATENTED FEB 16 1971 3,564,219

INVENTOR.
JOHN S. MUTZIGER
BY
ATTORNEY.

INDICATING DEVICE

The present invention relates to an indicating device. More particularly, the present invention relates to an indicator for indicating the amount of a web material stored upon a spool. In prior art devices, it is well known to utilize a counting device attached to a roller which, in turn, contacts a moving web member for guiding the same. It is not uncommon to provide such a guiding roller with a circumference which which is proportional to the unit of length which is to be utilized to measure the web member member passing over the roller. For example, if it is desired to measure the web member in feet, the circumference of the guide roller can be made to equal 1 foot wherein each revolution of the roller represents 1 foot of linear web motion. This arrangement is useful for counting the length of the web member which has passed over the roller. However, this approach does not provide a ready indication of the amount of the web member wound upon the spool. Other prior art devices utilize a mechanical follower which senses the radius of the web material wrapped upon the spool. This arrangement utilizes the principle that the larger the radius the greater the amount of web material upon the spool. In many applications, the arrangement is undesirable as it requires a physical contact with the web material.

The present invention utilizes the basic principles of the prior art to provide a unique combination which indicates the amount of a web material upon a spool by generating pulses proportional to the rotational velocity of the spool. A guide roller over which the web member passes is also arranged to generate a train of pulses proportional to the liner linear velocity of the web member. The pulses formed by the motion of the guide roller are applied to a counter which totals these pulses between each pulse received from the rotating spool. The resulting number of totaled pulses varies depending on the amount of web material upon the spool.

Accordingly, an object of the present invention is to provide an indicating device which will indicate the amount of web material upon a storage spool.

Another object of the invention presented herein is to provide a means for indicating the amount of web material wound upon a spool through the utilization of a device which does not contact the web material upon the spool and which is independent of the thickness of the web material for an accurate indication.

Still another object of this invention is to provide an indicating device which will accurately and immediately indicate the amount of web material wound upon a storage spool regardless of the starting point from which the web material is wound or unwound therefrom.

A further object of the present invention is to provide an indicating device which easily indicates the amount of a web material wound upon a storage spool and which may be adjusted for stopping the storage spool when a predetermined amount of the web material is wound or unwound therefrom.

Still a further object of the present invention is to provide an indicating device which will indicate the percent of web material remaining upon a spool independently of the speed at which the web member is being removed from the spool and independently of the direction of web motion.

Yet another object of the present invention is to provide an indicating device which utilizes existing components normally associated with a web winding machine and which requires no contact with the moving web other than the contact of the standard components associated with the web winding machine.

Other objects and many of the attendant advantages of the present invention will become apparent to those skilled in the art as a better understanding thereof is obtained by reference to the following detailed description when considered in connection with the accompanying drawings, wherein.

Figure 1:
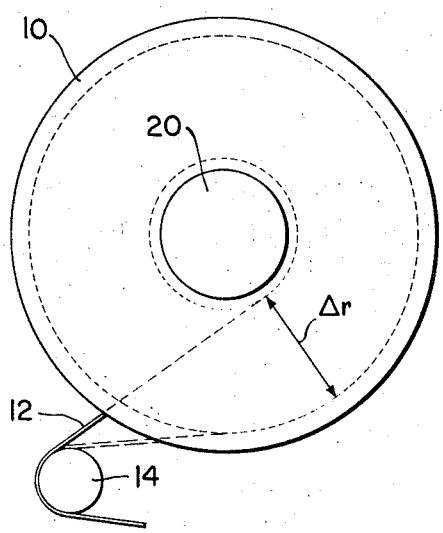
FIG. 1 is a diagrammatic representation of a spool having web material wound thereon and illustrating the normal web winding components necessary for operating the present invention.

Referring now to the drawings, FIG. 1 shows a spool 10 having a thin flexible web member 12 wound thereon. A guide roller 14 is arranged in juxtaposition with spool 10. As the thin flexible web member 12 is wound upon the spool 10, the initial radius of the wrap will be relatively small compared to the radius when the spool is filled thereby. Due to the radial difference between a full and empty spool, it is possible to determine the amount of web material upon the spool by measuring the rotational speed of the guide roller 14 during a revolution or partial revolution of the spool 10. After examining this relationship, it will be seen that the guide roller 14 rotates at a maximum speed per spool revolution when that spool 10 is full and rotates at a minimum speed per spool revolution when the spool 10 is empty. Utilizing this relationship, the present invention provides an indicating device for indicating the amount of the thin flexible web member wound upon the spool 10 at any given time.

Figure 2:
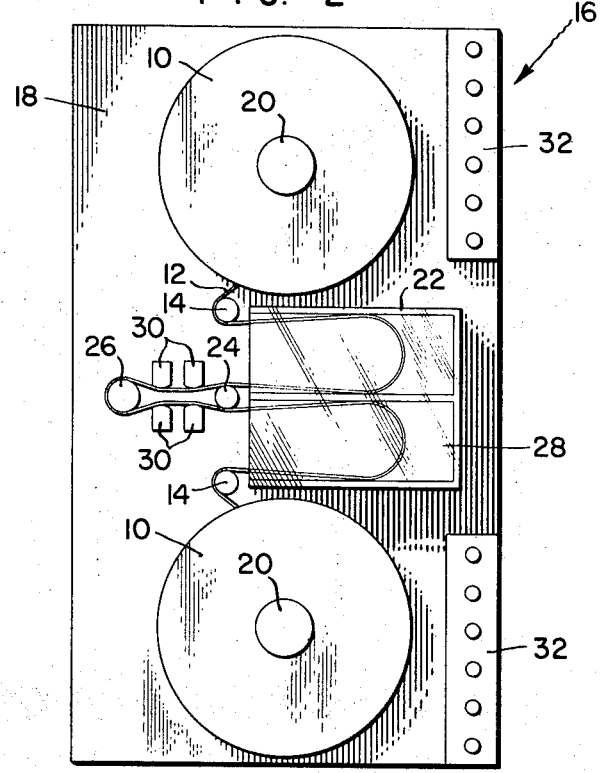
FIG. 2 is a front elevational view of a typical form of web winding machine in which the present invention may be utilized.

One embodiment in which the present invention may be conveniently utilized is within a web winding machine, such as a magnetic tape system shown at 16 in FIG. 2. The magnetic tape system includes a main frame mounting plate 18 to which a pair of spools 10 is mounted. Each spool is mounted by a suitable mounting hub 20 which is secured to the shaft of a suitable drive motor 21, FIG. 3. In the present invention, the spools 10 are arranged in the form of supply and take up reels. A first guide roller 14 is provided for guiding the thin flexible web member 12, such as magnetic tape, from the supply reel 10 into a first vacuum column 22. As the magnetic tape 12 exits the first vacuum column 22, it passes over a damping roller 24 and into the recording area of the magnetic tape system. The tape then wraps 180° about a capstan 26 and returns across the damping roller 24 to enter a second vacuum column 28. As the magnetic tape 12 exits the second vacuum column 28, it wraps about a second guide roller 14 before being wound upon the take up reel 10. In the embodiment shown, the recording area contains four magnetic transducers 30 including a pair of magnetic recording heads and a pair of reproducing heads. The magnetic tape system is controlled by a plurality of control means mounted on control panels 32. While the present invention is utilized within a magnetic tape system similar to that described herein, it should be understood that the indicating means of the present invention is not limited in application to this machine and may be advantageously utilized within many similar machines which handle thin flexible web material.

Figure 3:
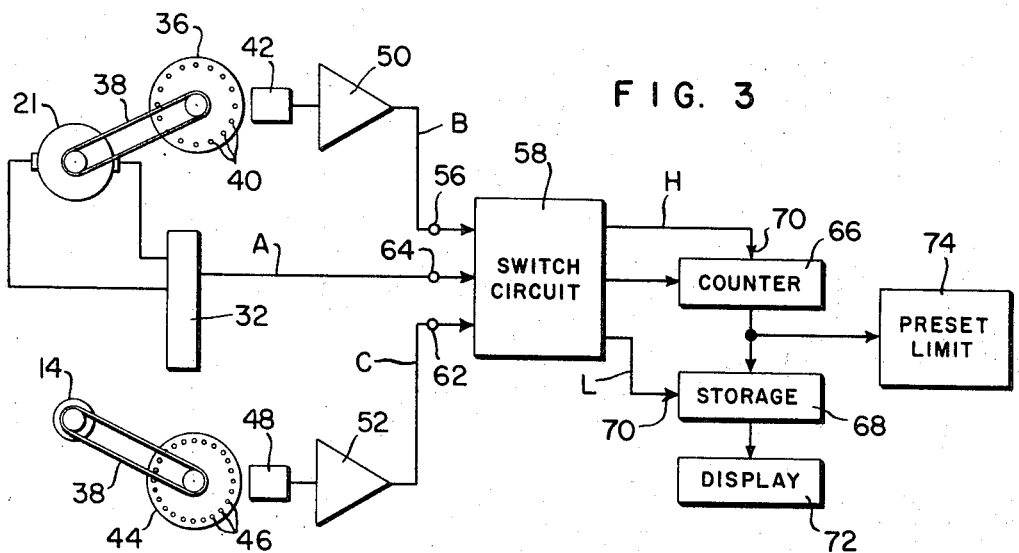
FIG. 3 is a block diagram, schematically illustrating the mechanical and electrical components of the present invention.

As illustrated in FIG. 3, the supply or take up reels are each driven by an individual reel drive motor 21 which, in the present embodiment, is illustrated only with respect to the supply reel. A first code wheel 36 is attached to the reel motor and arranged to be rotationally driven thereby. The code wheel 36 may be directly attached to the shaft of the reel motor, which extends beyond its rear end bell for this purpose. In the present embodiment, the code wheel is shown driven by a belt and pulley arrangement 38 wherein a belt is attached to a pulley mounted on the shaft of the reel motor 21 for driving a pulley mounted on the code wheel 36. The code wheel shaft may be rotationally mounted within a bearing housing, not shown. The first code wheel associated with the magnetic tape reel is provided with a plurality of information bits arranged on the disc-shaped wheel in the form of equally spaced apertures 40 passing through the outer periphery thereof. An energy source, not shown, provides electromagnetic energy which passes through the apertures for energizing a pickup device, such as a photoelectric cell 42. In a similar manner, the guide roller 14 is provided with a second code wheel 44. The code wheel 44 may be mounted directly on the roller shaft; or, as in the present embodiment, the code wheel may be driven by a pulley and belt arrangement 38. Obviously, the code wheel may be associated with any of the other guide elements which contact the moving magnetic tape, such as the capstan 26. The second disc-shaped code wheel 44 is provided with coded information in the form of a plurality of equally spaced apertures 46 arranged about the periphery thereof. A source of electromagnetic energy, not shown, is focused through the individual apertures upon a pick up device 48, in the form of a photoelectric cell. Each photoelectric cell, 42 and 48, is connected to an amplifier 50 and 52 respectfully. The output of the amplifier 50 provides a rotational reel input signal in the form of a generated pulse train illustrated a "B" in FIG. 5. The output of the amplifier 50 is connected to an input terminal 56 of a switching circuit 58. The output of amplifier 52 provides a rotational roller input signal as illustrated at "C" in FIG. 5. The roller input signal is applied to switching circuit 58 at a second input terminal 62. A third input terminal 64 of the switching circuit 58 is provided with an enabling signal "A" generated whenever the magnetic tape system 16 is energized for shuttling magnetic tape between the supply and take up reels 10. This enabling signal may be generated by the actuation of the proper mode on the control panel 32 which also removes the brakes holding the supply and take up reel motors.

The switching circuit 58 is connected to an accumulating counter circuit 66 whose output is connected to a count storage circuit 68. The switching circuit 58 also connects through a delay circuit, to be described hereinbelow, to the count storage circuit 68 at a terminal 70. The output of the count storage circuit 68 is applied to the input of a display circuit 72. As will be described in greater detail below, the display from the display circuit 68 may take the form of either a binary coded decimal or be converted to an analogue display. The output of the counter circuit 66 is also connected to a preset limiting circuit 74 which provides an output signal utilized for various purposes, such as stopping the tape system when a predetermined amount of magnetic tape is wound upon the reel. The preset limiting circuit could also be connected to the output of the count storage circuit 68, depending upon the internal circuitry thereof.

Figure 4:
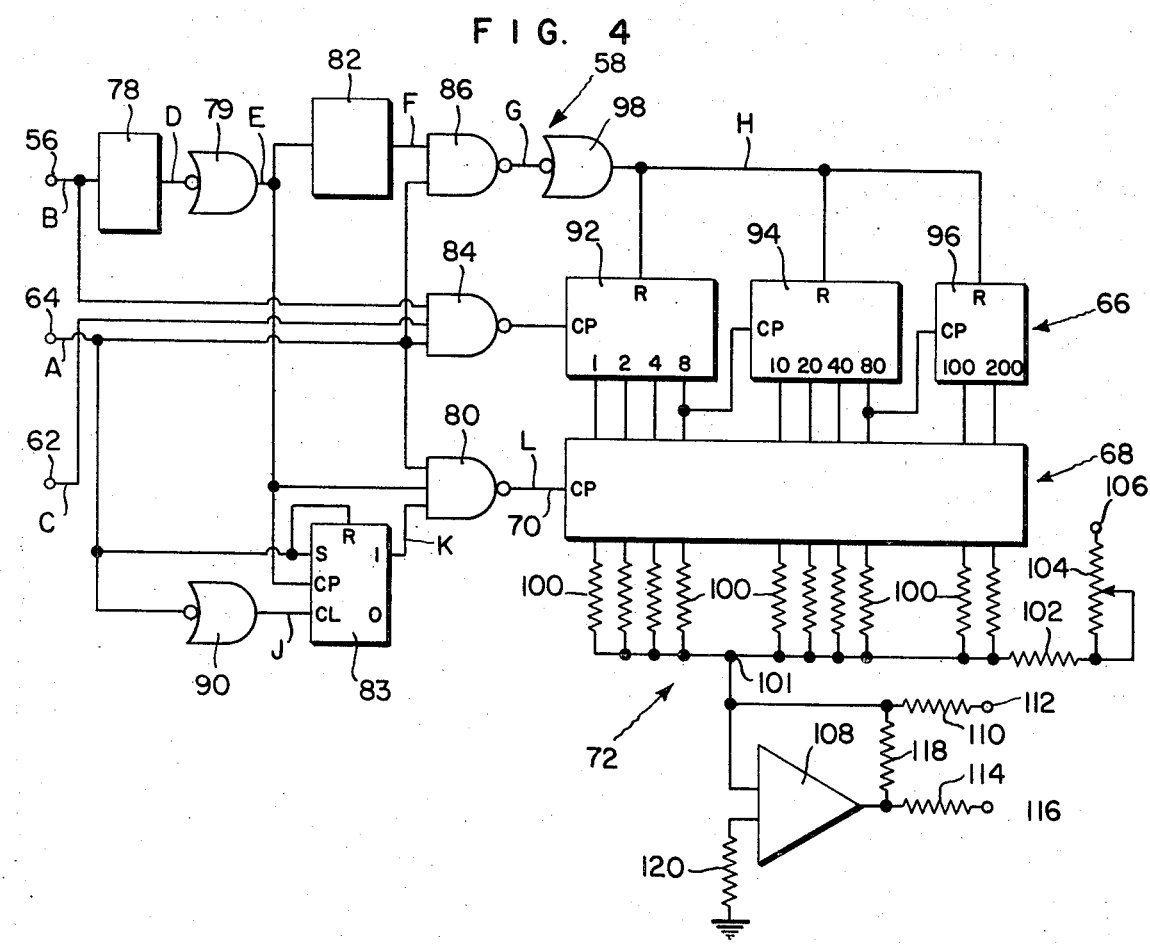
FIG. 4 is a schematic representation of the switching circuitry and other circuitry utilized within the present invention.

Referring to FIG. 4, the details of the switching circuit counter circuit 66, count storage circuit 68 and display circuit 72 are shown. The reel input signal from the rotating code wheel 36 is applied via the input terminal 56 to the input of a single shot circuit 78. The output of the single shot circuit 78 is applied to a NOR gate 79 which, in the present embodiment, is utilized as an inverter. The NOR gate 79, connects to one of three input terminals of a first NAND gate 80 and secondly connects to a second single shot circuit 82. The NOR gate 79 is thirdly connected to the clock pulse terminal "CP" of a flip-flop circuit 83. The input terminal 56 also connects to one of three terminals of a second NAND gate 84, while the input terminal 62, which receives the rotational roller input signal, connects to a second input terminal of the second NAND gate 84. The input terminal 64 is first connected to a third input terminal of the gate 84, secondly connected to a second input terminal of the first NAND gate 80, and thirdly connected to an input terminal of a third NAND gate 86. The output of the single shot circuit 82 connects to the second input terminal of the third NAND gate 86. Input terminal 64, which receives a gate enabling signal also connects to the set input terminal "S" and the reset input terminal "R" of the flip-flop circuit 83. An input terminal of a NOR gate 90 is attached to the input terminal 64, while the output terminal thereof is connected to the clear input terminal "CL" of the flip-flop circuit 83. The NOR gate 90 is utilized as an inverter in the present embodiment. The binary output terminal "1" of the flip-flop circuit 83 connects to the third input terminal of the first NAND gate 80.

The output of the NAND gate 84 is connected to the clock pulse terminal "CP" of the counter circuit 66. This circuit is constructed from a plurality of flip-flops connected in a decade counting chain. The first set of decade counters includes four flip-flops, not shown, connected in a manner for providing the binary outputs of 1, 2, 4 and 8. The second set of decade counters 94 is identical to the first set with the exception that the clock pulse input terminal thereof is triggered by the output of the first decade counter 92. The second decade counter 94 includes binary outputs of 10, 20, 40 and 80. The third decade counter 96 is similar to the first and second counters with the exception that its clock pulse input is triggered by counter 94 and its output includes the digits of 100 and 200. Obviously, the 400 and 800 binary output may be utilized to achieve greater resolution where required. Each of the decade counters 92, 94 and 96 are chain connected and provide with a reset input terminal "R." The output of the third NAND gate 86 is connected to the input of NOR gate 98 which acts as an inverter. The output of the NOR gate 98 is simultaneously applied to the reset terminals "R" of the decade counters 92, 94 and 96 for removing the accumulated count therein in a predetermined sequence, described hr hereinbelow, after the count has been transferred to the count storage circuit 68.

Each output terminal of the decade counters 92, 94 and 96 is connected to an input terminal of the count storage circuit 68. The count storage circuit 68 includes a plurality of flip-flop circuits which are utilized to store the pulses counted by the counter circuit 66. The output of the first NAND gate 80 is applied at 70 to the clock pulse terminal "CP" of the count storage circuit 68 whose output is connected to a plurality of parallelly connected resistors 100 which form the input stage of the display circuit 72. A common output junction 101 of the a parallelly connected resistors 100 is connected through a biasing resistor 102 and an adjustable resistor 104 to a power source, indicated by terminal 106. The common junction 101 also connects to the input terminal of an amplifier 108 and through an output resistor 110 to a meter terminal 112. The output of the amplifier 108 connects through a second output resistor 114 to a second meter terminal 116, while a feedback resistor 118 is provided between the output terminal of the amplifier 108 and the junction 101. The second input terminal of the amplifier 108 connects through a biasing resistor 120 to a source of reference potential, such as ground, for completing the circuit.

In operation, the magnetic tape system 16 is started by actuation of the proper mode of the control panel 32. The motion of the tape passing over the guide roller 14 causes rotational motion of the second code wheel 44 attached thereto. As the code wheel rotates, the apertures 46 therein pass between the source of electromagnetic energy and the photoelectric cell 48. The amplifier 52 is arranged to provide a roller input signal "C" in the form of positive going pulses generated during the time period when the electromagnetic energy from the source is prevented from reaching the photoelectric cell 48 by the absence of an aperture 46 therebetween. These positive pulses are applied to the input terminal 62 and then to the input terminal of the NAND gate 84. A positive gate enabling signal "A" is applied to the input terminal 64 and fed through that terminal to the inputs of the NAND gates 80, 84 and 86 whenever the magnetic tape is in motion. As the magnetic tape 12 is removed from the magnetic tape reel 10, the first code wheel 36 begins to rotate for passing a first aperture 40 therein between the energy source and the photoelectric cell 42. In a manner similar to the roller input signal "C" the amplifier 50 produces positive going pulses during the absence of electromagnetic energy upon the photoelectric cell 42. This positive going reel input signal "B" is applied through the input terminal 56 to the input of the NAND gate 84 and the single shot circuit 78. Thus, it will be seen that each pulse generated by the code wheel 44 places a positive pulse on the input of the NAND gate 84 while each pulse generated by the code wheel 36 also places a positive pulse on the input of that gate. As the pulse train "C" from the code wheel 44 is generated at a substantially higher rate than the pulse train "B" from code wheel 36, the pulses from code wheel 44 pass through the NAND gate 84 as a negative going pulse for application to the clock pulse input terminal "CP" of the first decade counter 92. As the code wheel 36 begins to rotate, a first aperture 40 passes between the source of electromagnetic energy and the photoelectric cell 42 for causing a negative going pulse to be applied to the input of the NAND gate 84. This has the effect of disabling the NAND gate 84 and stopping the count applied to the first decade counter 92. This same negative going pulse triggers the single shot circuit 78 which generates a negative going pulse signal "D" whose leading, negative going edge corresponds in time with the leading, negative going edge of the pulse signal "B" generated by code wheel 36. The signal "D" is inverted by the NOR gate 79 and applied as a positive going pulse signal "E" to the input of the single shot circuit 82 and the input of the first NAND gate 80. The second input of the first NAND gate 80 is provided by the gate enabling signal "A" from terminal 64.

When the magnetic tape 12 is first placed into motion, it is not desirable to transfer the partial count in the counter circuit 66 to the count storage circuit 68. Thus, the positive going pulse signal "E" applied to the input of the first NAND gate 80 from the NOR gate 79 does not pass through that gate, as the inverted signal "L", since there is no positive enabling signal applied thereto from the flip-flop circuit 83. As the positive pulse "E" switches back to a negative pulse, the flip-flop 83 is triggered on the negative going edge thereof for producing a positive output signal "K." This signal is applied continuously to the input of the NAND gate 80 and is uneffected by further pulses from the NOR gate 79 until the enabling signal "A" and its inverted signal "J" are removed by actuating the proper control means for stopping the motion of the magnetic tape 12. When the signal "A" is removed from the reset terminal "R" of the flip-flop 83, the flip-flop output signal "K" is returned to a negative going signal as the pulse signal "E" from the NOR gate 79 goes negative.

The pulse signal "E" from the NOR gate 79 is applied to the input of the single shot circuit 82 for producing a negative going output pulse signal "F" which is triggered on the negative going edge of the single "E." This causes the pulse signal "F" to be delayed for a time period determined by the width of the pulse signal "E." The negative pulse signal "F" is applied to the NAND gate 86 which has the positive enabling signal "A" applied thereto from the terminal 64. This causes the NAND gate 86 to generate a positive pulse signal "G" which is inverted by NOR gate 98 into signal "H" and applied to the reset terminals "R" of the decade counters 92, 94 and 96. The decade counters reset on the negative going edge of the signal "H." In the start condition, therefore, it will be seen that the partial count within the counter circuit 66 is reset before it may be transferred into the storage circuit 68 for preventing an erroneous partial count from being displayed.

After the first aperture 40 has past the photoelectric cell 42, the positive pulse signal "B" is again applied to the input terminal 56 and NAND gate 84. Each following pulse from the second code wheel 44 is applied to the second NAND gate 84 and then to the decade counters 92, 94 and 96. As the second aperture 40 within the first code wheel 36 passes the photoelectric cell 42, a negative pulse is generated and applied to the second NAND gate 84 for disabling that gate and stopping the count accumulation. At the same instant, the single shot circuit 78 applies a negative pulse "D" to the NOR gate 79 which applies a positive pulse "E" to the first NAND gate 80. As the flip-flop 83 now applies a positive signal to the NAND gate 80, the output signal "L" thereof is applied to the clock pulse terminal "CP" of the count storage circuit 68 for transferring the count in circuit 66 thereto. The positive pulse "E" generated by inverting NOR-gate 79 is also applied to the single shot circuit 82 which generates a delayed negative pulse "F" to the NAND gate 86. As indicated hereinabove, the flip-flop 83 is unaffected by the positive pulse "E" from the NOR gate 79. The NAND gate 86 generates a positive pulse "G," when pulsed by the single shot circuit 82, which is inverted by NOR gate 98, into signal "H" and applied to the reset terminals "R" of the decade counters 92, 94 and 96. The decade counters reset on the negative going edge of the pulse signal "H" for clearing the previous count therefrom. As the second aperture 40 passes beyond the photoelectric cell 42, a new positive pulse "B" enables the second NAND gate 84; while signal "E" disables the first NAND gate 80. Thus, a subsequent counting period is begun.

In stopping the magnetic tape 12, the removal of the positive signal "A" causes a negative signal to be applied to the NAND gate 86. As the signal "F" is positive between pulses from the code wheel 36, the NAND gate 86 will produce a positive output signal "G" which is inverted by NOR gate 98 and applied as a negative going signal "H" to the reset terminals "R" of counters 92, 94 and 96. This resets the partial count within the counter before the transfer signal is applied to the storage circuit 68. Thus, the transfer of an erroneous partial count to the storage circuit 68 and display circuit 72 is prevented during a stopping condition just as it is during the starting condition of the magnetic tape system 16.

Figure 5:
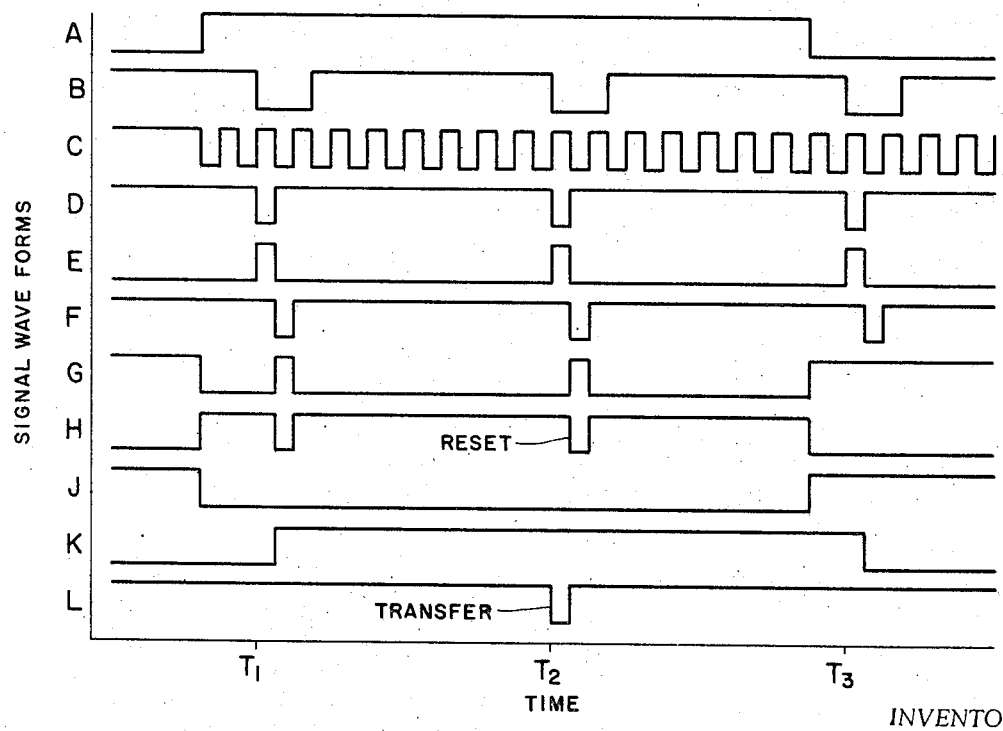
FIG. 5 is a timing diagram showing the signal wave forms generated by the circuitry of FIGS. 4 and 5.

It will be seen in FIG. 5 that the output from the second code wheel 44 forms, in this embodiment, square wave signal indicated by the roller input signal "C." This signal is continuously generated during the motion of the magnetic tape 12 over the guide roller 14. The signal generated by the first code wheel 36 produces a negative going reel input signal "B" during the period that an aperture within the code wheel 36 is aligned with the source of electromagnetic energy and the photoelectric cell 42. Thus, the counter circuit 66 counts the pulses generated by the roller rotation during a counting period established by the reel rotation. The duration of the counting period varies in accordance with the radius of the magnetic tape 12 upon the magnetic tape reel 10. That is, for each turn of the reel 10, a varying amount of tape will be unwrapped from the reel depending on the amount of tape wound thereon at that time. For example, if the circumference of the guide roller 14 were three inches, the guide roller would rotate 4 times for every foot of magnetic tape passing thereover. If the second code wheel were arranged with 250 apertures therein, there would be 1,000 pulses per foot of magnetic tape passing over the roller. If the reel of magnetic tape 10 were substantially empty, it would have a circumference of approximately 1 foot. Assuming the first code wheel has 16 apertures therein, 1 foot of magnetic tape unwrapped from the reel 12 would generate 16 positive going pulses as it unwraps therefrom. Thus, the minimum number of pulses generated by the second roller code wheel 44 for each pulse generated by the first reel code wheel 36 would be approximately 62. In the maximum condition, the reel of magnetic tape 10 is filled with tape to a diameter of approximately 14 inches. That is, the circumference of a full reel of magnetic tape is approximately 3½ feet. Thus, 1 foot of magnetic tape unwrapping from a full reel generates 4½ pulses per foot as it unwraps therefrom. The maximum number of pulses generated per counting period then becomes 220. Thus, it may be seen that a difference of approximately 160 pulses exists between the minimum condition, with the reel of tape substantially empty, and the maximum condition with the reel of tape substantially full. If the length of tape wrapped upon the reel were 2,400 feet, for example, the indicating device thus described would be capable of indicating a new segment of tape every 15 feet.

It will be seen from the foregoing that the indicating device of the present invention is capable of indicating the amount of magnetic tape remaining upon a storage reel regardless of the point at which the measurement is taken. Further, the accuracy of this arrangement depends only on the accuracy of the reel, tape, and roller dimensions. The indication will be accurate regardless of the thickness of the magnetic tape or the amount of tape upon the reel when the measurement is initially begun. It may also be seen that a digital display system may be provided for by connection to the output of the count storage circuit 68, while an analogue display may be provided by connection to the output terminals 112 and 116.

The invention described herein may be modified further when the magnetic tape, or other web member is drawn at a constant speed over the guide roller 14. In this condition, as the magnetic tape speed is constant, a constant level reference signal may be generated by suitable means such as a battery, and applied to an electronic integrator. The resultant signal level will vary depending upon the length of the time period that the reference signal is applied to the electronic integrator. This time period will be controlled by the reel rotational speed as described herein. The constant level signal may be linked to the speed selection of the magnetic tape such that its level is changed in proportion to the speed selected. Thus, it will be seen that the reference signal means and the electronic integrator sense the linear speed of the magnetic tape 12; while the rotational speed of the reel is sensed by the code wheel 36 and photoelectric cell 42. The two signals are then compared by the switching circuit 58 for determining the amount of magnetic tape 12 upon the reel 10.

While the present invention has been described with respect to magnetic tape and a magnetic tape system, it will be obvious that such a system is adaptable for use with paper, tape, cloth, or any other form of thin flexible material which may be wound upon a spool. Therefore, many modifications and variations of the present invention will become apparent to those skilled in the art in light of the above teachings; and it should be understood that the embodiments described herein are illustrations rather than limitations of the scope of the present invention. Consequently, the present invention should be limited only by the appended claims.

I claim:

1. An indicating device for indicating the quantity of a thin flexible web member remaining upon a reel means, comprising:

first pulse generating means associated with said reel means;
   guide roller means arranged for guiding said thin flexible web member to and from said means;
   second pulse generating means associated with said guide roller means;
   counting means;
   switching means for applying pulses from said second pulse generating means to said counting means between pulses from said first pulse generating means also applied thereto;
   display means associated with said counting means, said counting means including storage means arranged for storing said counted pulses from said second pulse generating means and applying said stored count to said display means upon receipt of a pulse from said first pulse generating means, thereby indicating the amount of said thin flexible web member remaining upon said reel means and additionally said gate means having a first gate for receiving pulses from said first pulse generating means and a second gate for receiving pulses from said first and second pulse generating means, said second gate arranged for pulsing said counting means with pulses from said second pulse generating means during a time period between pulses from said first pulse generating means, said first gate arranged for pulsing said storage means with pulses from said first pulse generating means to transfer said pulses from said counting means to said storage means for displaying the quantity of said pulses upon said display means.

2. An indicating device as claimed in claim 1 additionally comprising present limiting means connected to said switching means for receiving said pulses generated by said second pulse generating means between said pulses generated by said first pulse generating means and arranged to generate a signal at a predetermined count corresponding with a predetermined position of said thin flexible web member upon said reel means.

3. An indicating device as claimed in claim 1 wherein said display means includes means for displaying a binary coded decimal.

4. An indicating device as claimed in claim 1, wherein said display means includes means for generating a binary coded decimal signal and a digital to analogue converter means for providing an analogue display of said signal.